(12) United States Patent
Hayashi et al.

(10) Patent No.: US 10,797,957 B2
(45) Date of Patent: Oct. 6, 2020

(54) NETWORK MANAGEMENT APPARATUS, NETWORK MANAGEMENT METHOD, NETWORK MANAGEMENT SYSTEM, AND PROGRAM

(71) Applicant: NEC CORPORATION, Tokyo (JP)

(72) Inventors: Yuki Hayashi, Tokyo (JP); Jun Suzuki, Tokyo (JP); Masaki Kan, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 166 days.

(21) Appl. No.: 15/771,800

(22) PCT Filed: Oct. 27, 2016

(86) PCT No.: PCT/JP2016/081875
§ 371 (c)(1),
(2) Date: Apr. 27, 2018

(87) PCT Pub. No.: WO2017/073661
PCT Pub. Date: May 4, 2017

(65) Prior Publication Data
US 2018/0343168 A1    Nov. 29, 2018

(30) Foreign Application Priority Data
Oct. 28, 2015   (JP) ................................. 2015-211524

(51) Int. Cl.
*H04L 12/825*     (2013.01)
*H04L 12/851*     (2013.01)
*H04L 12/24*      (2006.01)

(52) U.S. Cl.
CPC ...... *H04L 41/0896* (2013.01); *H04L 47/2483* (2013.01); *H04L 47/25* (2013.01)

(58) Field of Classification Search
CPC . H04L 41/0896; H04L 47/2483; H04L 47/25; H04L 47/10; H04L 47/17;
(Continued)

(56) References Cited

U.S. PATENT DOCUMENTS 7,035,264 B2    4/2006  Seki et al.
7,872,976 B2    6/2011  Acharya et al.
(Continued)

FOREIGN PATENT DOCUMENTS

JP    2002-094513 A    3/2002
JP    2004-336777 A    11/2004
(Continued)

OTHER PUBLICATIONS

International Search Report for PCT/JP2016/081875, dated Jan. 24, 2017.

*Primary Examiner* — Awet Haile
(74) *Attorney, Agent, or Firm* — Sughrue Mion, PLLC

(57) ABSTRACT

A network management apparatus includes: a determination part that determines, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied; and a setting part that gradually changes the set of transmission rates set for the plurality of groups from the start state to the end state while using the determined set(s) of transmission rates in the intermediate state(s).

18 Claims, 10 Drawing Sheets

START STATE

END STATE

(58) Field of Classification Search
CPC ......... H04L 47/27; H04L 47/29; H04L 47/32; H04L 47/37
See application file for complete search history.

(56) References Cited

U.S. PATENT DOCUMENTS

| | | | |
|---|---|---|---|
| 9,270,538 B2 | 2/2016 | Takita et al. | |
| 2004/0213247 A1 | 10/2004 | Seki et al. | |
| 2004/0218595 A1 | 11/2004 | Acharya et al. | |
| 2007/0280115 A1* | 12/2007 | Meyer | H04L 47/10 370/236 |
| 2014/0344433 A1* | 11/2014 | Takita | H04L 41/145 709/223 |

FOREIGN PATENT DOCUMENTS

| | | |
|---|---|---|
| JP | 2005-064807 A | 3/2005 |
| JP | 2014-229938 A | 12/2014 |

\* cited by examiner

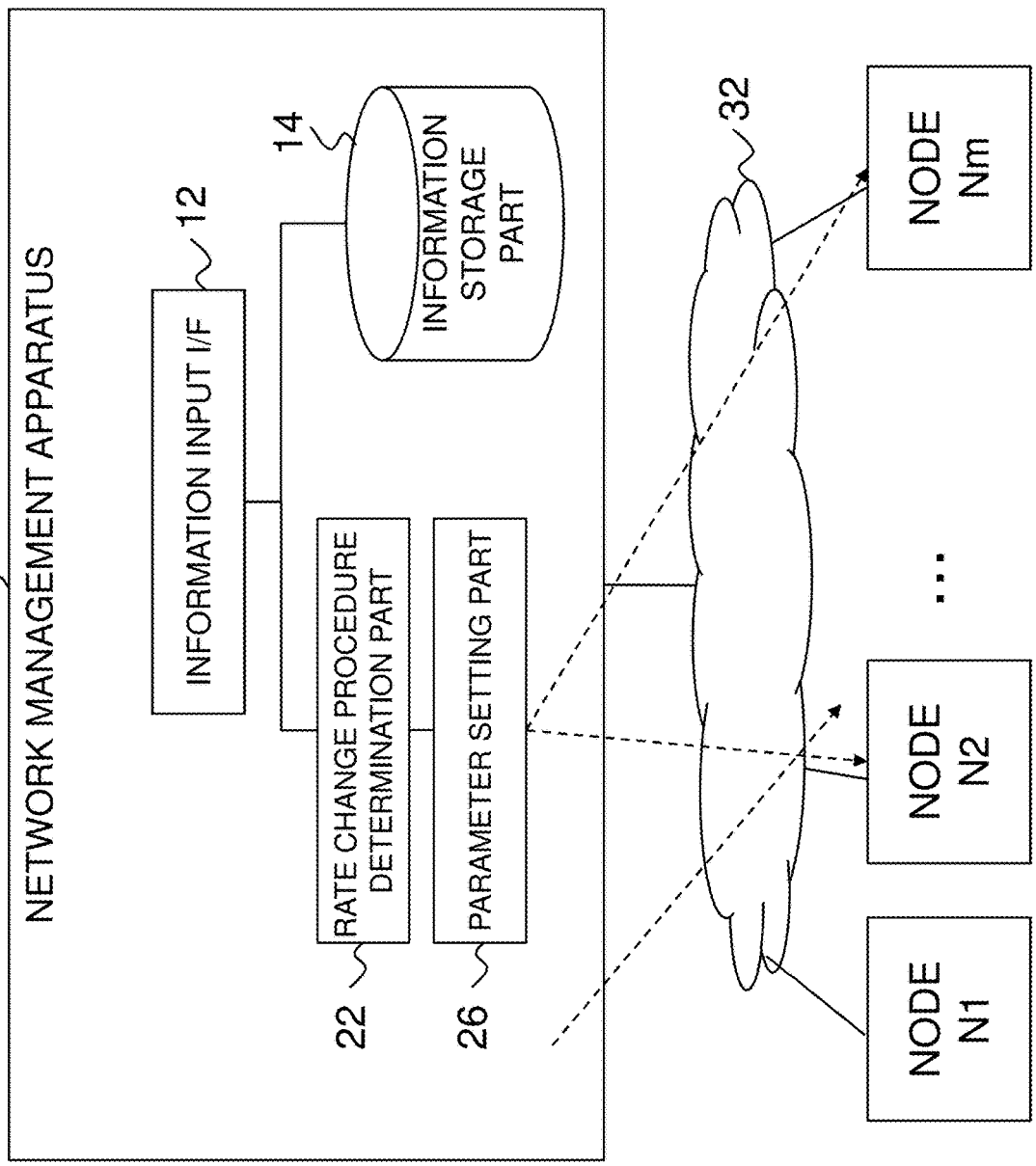

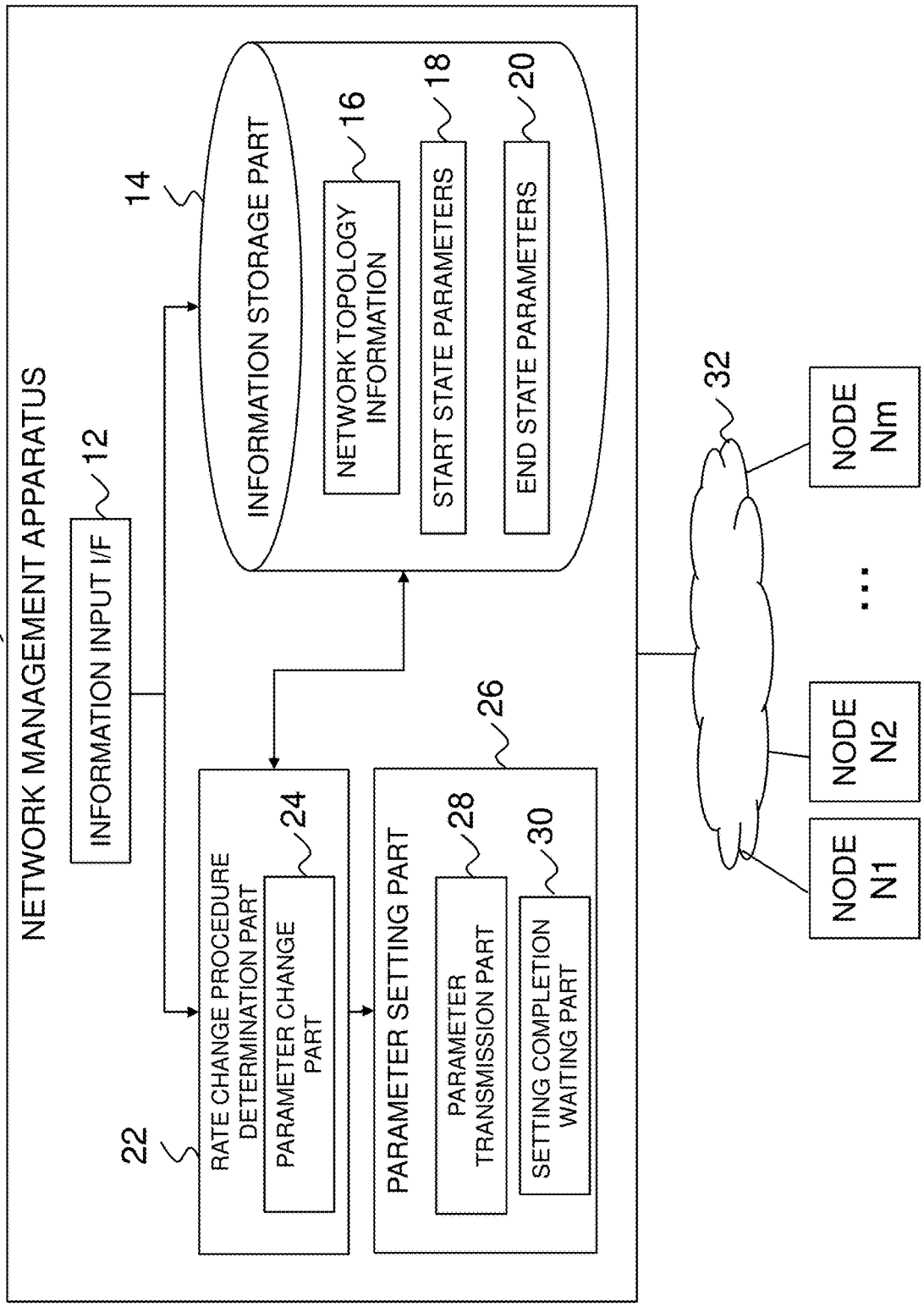

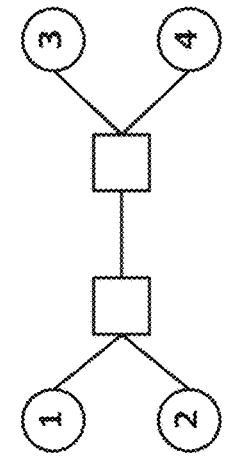
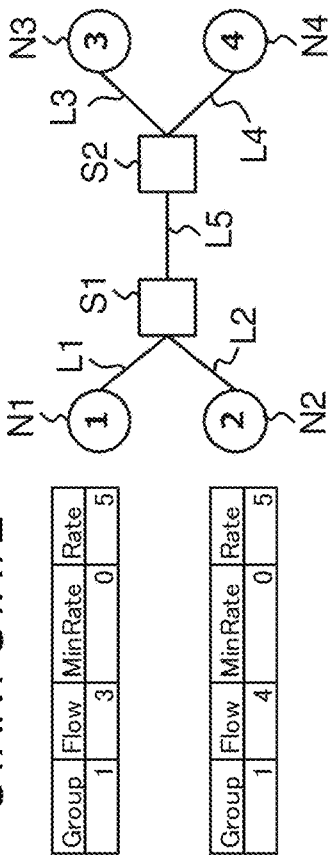
FIG. 6(a) START STATE
FIG. 6(b) STEP S3
FIG. 6(c) STEP S4
FIG. 6(d) STEP S5 (END STATE)

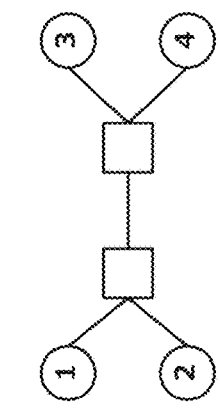
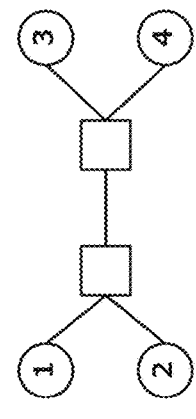
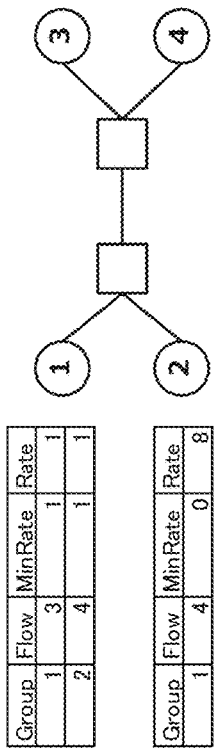
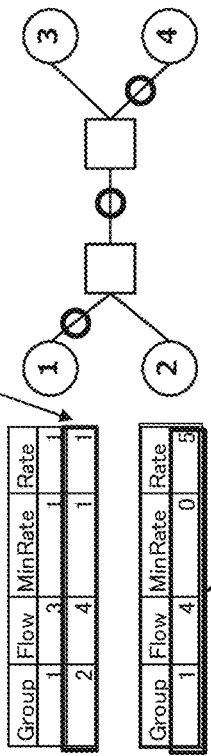
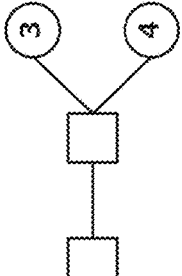

START STATE

STEP S8

STEP S9

STEP S11

STEP S12 (END STATE)

US 10,797,957 B2

NETWORK MANAGEMENT APPARATUS, NETWORK MANAGEMENT METHOD, NETWORK MANAGEMENT SYSTEM, AND PROGRAM

CROSS REFERENCE TO RELATED APPLICATIONS

This application is a National Stage of International Application No. PCT/JP2016/081875 filed Oct. 27, 2016, claiming priority based on Japanese Patent Application No. 2015-211524 filed Oct. 28, 2015.

FIELD

Reference to Related Application

The present invention is based upon and claims the benefit of the priority of Japanese patent application No. 2015-211524, filed on Oct. 28, 2015, the disclosure of which is incorporated herein in its entirety by reference thereto.

The present invention relates to a network management apparatus, a network management method, a network management system, and a program. In particular, it relates to a network management apparatus, a network management method, a network management system, and a program that guarantee a communication delay.

BACKGROUND

Generally, in a real time system, the communication delay of one or more flows exchanged between nodes in a network needs to be guaranteed to fall within a certain time. For example, a control message in a broadcast master system needs to guarantee a communication delay of 16 ms (milliseconds) or less, to complete processing on a single video frame. Thus, there is a method in which a communication delay is guaranteed by reserving a bandwidth for a flow passing through a network. With this method, however, when a node connected to the network or a flow exchanged between nodes is added or changed, the reserved bandwidth needs to be reset.

As a related technique, PTL 1 discloses a technique in which communication paths are changed by causing a plurality of node devices to temporally synchronize with each other.

In addition, PTL 2 discloses a technique in which, when the number of communication devices connected to a network is changed, the allowable bandwidth of the network is equally divided based on the changed number of communication devices, to equally allocate a bandwidth to an individual communication device.

In addition, the inventors of the present invention have proposed a technique in which groups to which flows belong and a set of transmission rates for the groups are determined so that the network utilization efficiency is improved (Japanese patent application No. 2015-057989).

PTL 1: Japanese Patent Kokai Publication No. JP2002-094513A
PTL 2: Japanese Patent Kokai Publication No. JP2005-064807A

SUMMARY

The disclosure of the above PTLs is incorporated herein by reference thereto. The following analysis has been made by the present inventors.

Hereinafter, a flow of data transmitted in one direction between two nodes will be referred to as a "flow". In addition, a group of one or more flows will be referred to as a "group". Generally, when a set of transmission rates set for a plurality of groups is gradually changed from a start state to an end state, unless an appropriate state(s) is used as an intermediate state(s), a sum of transmission rates could exceed the resource capacity of a network (for example, the capacity of links in the network).

This point will be described with reference to FIG. 10. FIG. 10 illustrates an example of a configuration of a network system. As illustrated in FIG. 10, the network system includes nodes N1 to N3 and a network management apparatus 36 that sets parameters (for example, flows included in individual groups, transmission rates of individual groups, etc.) for the nodes N1 to N3. The nodes N1 to N3 and the network management apparatus 36 are connected to each other via a network 32.

The following example assumes a case in which a link (not illustrated) having a link capacity of "12" is shared by a flow (referred to as a flow 1) from the node N1 to a node Nx (not illustrated), a flow (referred to as a flow 2) from the node N2 to the node Nx, and a flow (referred to as a flow 3) from the node N3 to the node Nx. In addition, as illustrated in FIG. 10, the following example assumes that transmission rates of the flows 1 to 3 are "2", "5", and "5", respectively, in a start state and that the transmission rates of the flows 1 to 3 are "5", "4", and "3", respectively, in an end state.

This example assumes that the set of transmission rates of the flows 1 to 3 undergo an intermediate state before gradually changing from the start state to the end state. In the intermediate state, the transmission rate of the flow 1 is "5", which is the same transmission rate of flow 1 in the end state, and the transmission rates of the flows 2 and 3 are not changed from the start state. In this case, in the intermediate state, the sum of the flow transmission rates on the link shared by the flows 1 to 3 is "15". Namely, the sum exceeds the link capacity of "12" set for this link. In this case, the delay of the individual flow could not be guaranteed.

Thus, instead of gradually changing the set of transmission rates from the start state to the end state, as with the technique disclosed in PTL 1, all the transmission rates could be changed simultaneously by causing all the nodes to perform time synchronization. However, with this technique, when the number of nodes is increased, it is difficult to cause many nodes to accurately perform time synchronization.

In addition, as disclosed in PTL 2, with the technique in which the allowable bandwidth of a network is equally divided and a bandwidth is equally allocated to an individual communication device, an equal bandwidth is always allocated to an individual communication device. Namely, this technique has a problem in that a bandwidth cannot be set per communication device and flow.

Thus, there is demanded a technique of flexibly changing a set of transmission rates set for a plurality of groups including flows while satisfying constraints on link bandwidths without needing to perform time synchronization among nodes. It is an object of the present invention to provide a network management apparatus, a network management system, a network management method, and a program that contribute to meeting the above demand.

A network management apparatus according to a first aspect includes a determination part that determines, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied. The network management apparatus also includes a setting part that gradually changes the set of transmission rates set for the plurality of groups from the start state to the end state while using the determined set(s) of transmission rates in the intermediate state(s).

A network management method according to a second aspect includes determining, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied. The network management method also includes gradually changing the set of transmission rates set for the plurality of groups from the start state to the end state while using the determined set(s) of transmission rates in the intermediate state(s).

A network management system according to a third aspect includes: a plurality of nodes: and a network management apparatus that manages the plurality of nodes. The network management apparatus includes a determination part that determines, when a set of transmission rates set for a plurality of groups including one or more flows exchanged among the plurality of nodes is gradually changed from a start state to an end state, a set(s) of transmission rates used in an intermediate state(s) in such a manner that a constraint(s) on a bandwidth(s) of a link(s) through which a flow(s) passes is satisfied. The network management apparatus also includes a setting part that gradually changes the set of transmission rates set for the plurality of groups from the start state to the end state while using the determined set(s) of transmission rates in the intermediate state(s).

A program according to a fourth aspect causes a computer to execute processing for determining, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied. The program also causes the computer to execute processing for gradually changing the set of transmission rates set for the plurality of groups from the start state to the end state while using the determined set(s) of transmission rates in the intermediate state(s).

The program can be provided as a program product recorded in a non-transitory computer-readable storage medium.

The meritorious effects of the present disclosure are summarized as follows.

With a network management apparatus, a network management method, a network management system, and a program according to the present disclosure, when it is necessary to change transmission rates set for groups including flows while satisfying constraints on link bandwidths, it is possible to flexibly set the transmission rates set for the groups including the flows without needing to perform time synchronization among nodes.

BRIEF DESCRIPTION OF DRAWINGS

FIG. 3 illustrates an example of a configuration of a network management system according to a first exemplary embodiment of the present disclosure.

FIG. 4 is a block diagram illustrating an example of a configuration of a network management apparatus according to the first exemplary embodiment.

FIGS. 6(a)-(d) illustrate specific operation example 1 of the network management apparatus according to the first exemplary embodiment.

FIGS. 7(a)-(e) illustrate specific operation example 2 of the network management apparatus according to the first exemplary embodiment.

PREFERRED MODES

Figure 1:
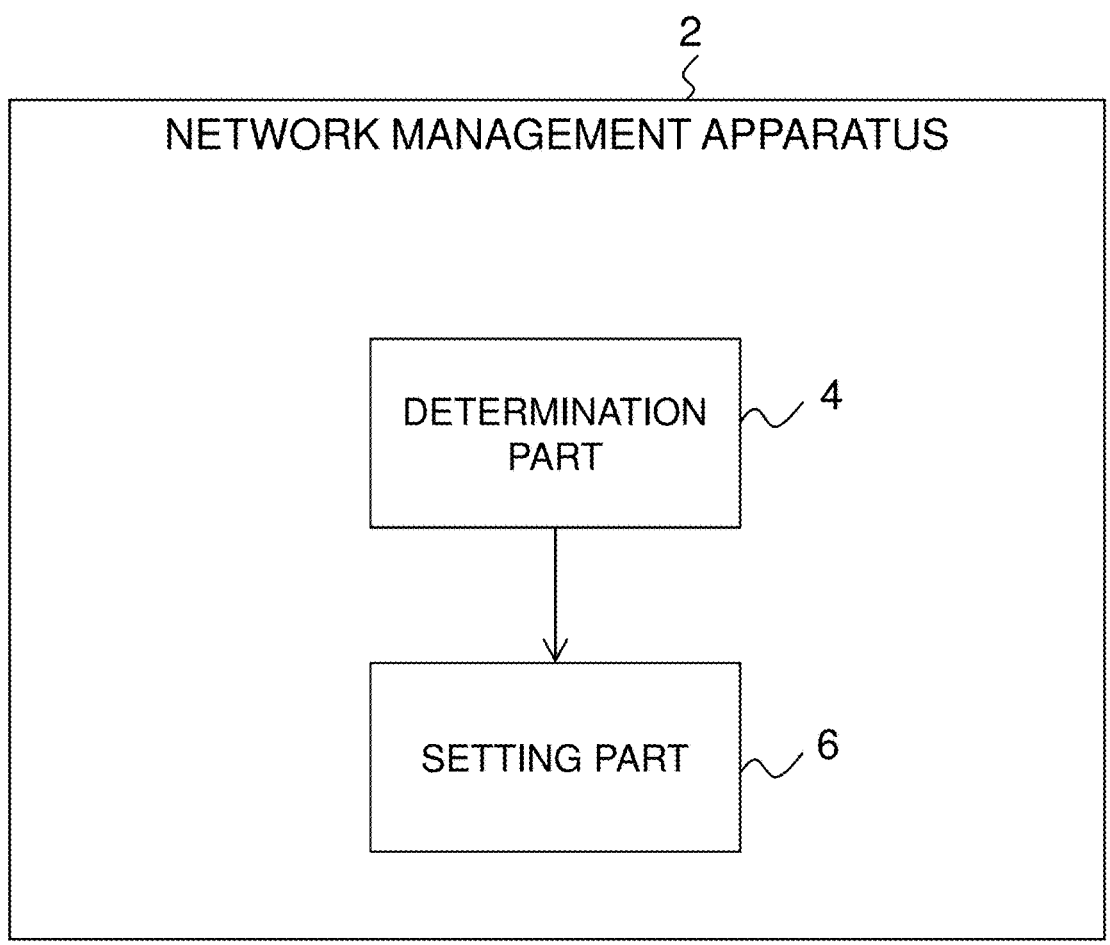
FIG. 1 is a block diagram illustrating an example of a configuration of a network management apparatus according to an exemplary embodiment.

First, an outline of an exemplary embodiment will be described. Reference characters in the following outline are merely used as examples to facilitate understanding of the present disclosure.

Therefore, the reference characters are not intended to limit the present disclosure to the illustrated modes.

FIG. 1 is a block diagram illustrating an example of a configuration of a network management apparatus 2 according to an exemplary embodiment. As illustrated in FIG. 1, the network management apparatus 2 includes a determination part 4 and a setting part 6.

When a set of transmission rates set for a plurality of groups including one or more flows is gradually changed from a start state to an end state, the determination part 4 determines a set(s) of transmission rates used in an intermediate state(s) in such a manner that a constraint(s) on a bandwidth(s) of a link(s) through which a flow(s) passes is satisfied. In addition, the setting part 6 gradually changes the set of transmission rates set for the plurality of groups from the start state to the end state while using the determined set(s) of transmission rates in the intermediate state(s).

In this operation, since the setting part 6 gradually (namely, sequentially) changes the set of transmission rates set for the plurality of groups, synchronization does not need to be performed among a plurality of nodes which are the transmission sources of the flows included in the plurality of groups. In addition, unlike the technique disclosed in PTL 2, since no specific constraints are imposed on the transmission rates in the start state and the end state, the transmission rates can flexibly be changed (for example, individually per group). In addition, by selecting an intermediate state(s) in such a manner that a constraint(s) on a bandwidth(s) of a link(s) through which a flow(s) passes is satisfied, the constraint(s) on the link bandwidth(s) can be satisfied throughout the period from the start state to the end state.

Thus, the network management apparatus 2 according to the exemplary embodiment can flexibly change a set of transmission rates 240 set for a plurality of groups including a flow(s) while satisfying a constraint(s) on a bandwidth(s) of a link(s) without needing to perform synchronization among nodes.

Figure 2B:
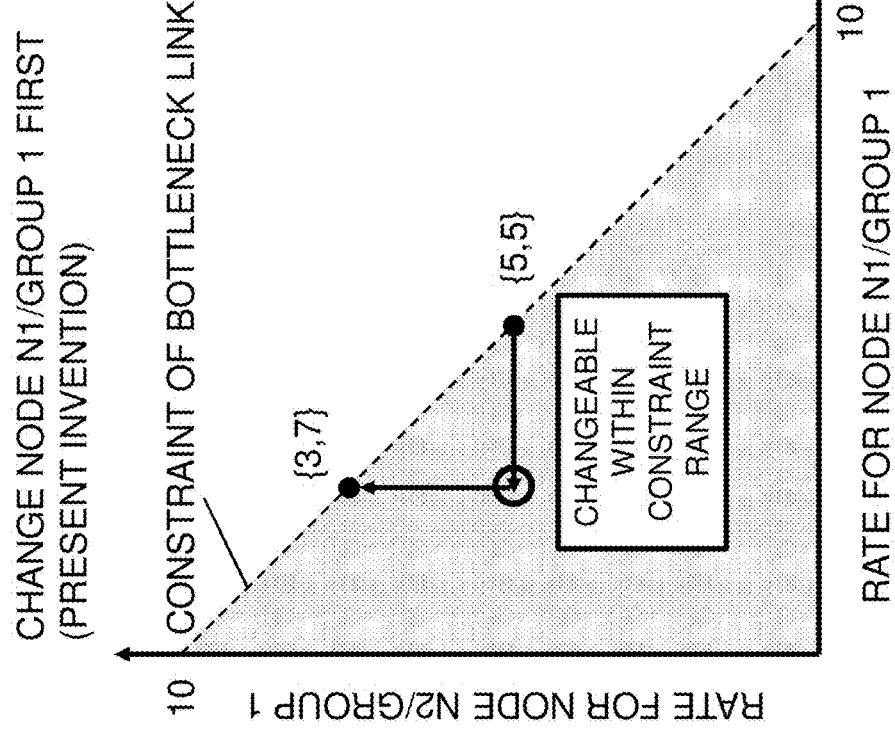
FIGS. 2(a)-(b) illustrate an advantageous effect provided by the network management apparatus according to the exemplary embodiment.
Figure 2A:
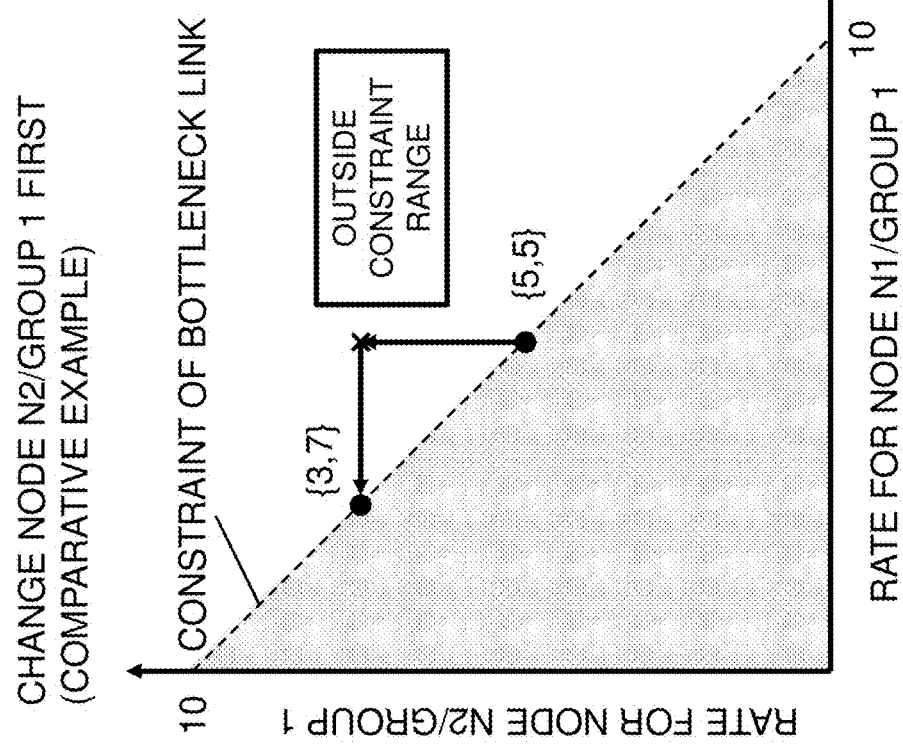

FIGS. 2(a)-(b) are diagram for visually understanding an advantageous effect provided by the network management apparatus 2 according to the exemplary embodiment. The following example assumes a case in which a bottleneck link (not illustrated) having a link capacity of "10" is shared by a flow (referred to as a node 1/group 1) from a node N1 to a node Nx (not illustrated) and a flow (referred to as a node 2/group 1) from a node N2 to the node Nx. In addition, as illustrated in FIGS. 2(a)-(b), the following example assumes that the transmission rates for the node 1/group 1 and the node 2/group 1 in the start state are "5" and "5", respectively, and that the transmission rates for the node 1/group 1 and the node 2/group 1 in the end state are "3" and "7", respectively.

In this case, as illustrated in a comparative example in FIG. 2(a), when an intermediate state in which the node 1/group 1 has the transmission rate in the start state and the node 2/group 1 has the transmission rate in the end state is selected, the sum of the transmission rates for these groups is "12", which is more than the link capacity "10" of this bottleneck link. In contrast, according to the exemplary embodiment of the present disclosure, the network management apparatus 2 determines a set(s) of transmission rates used in an intermediate state(s) in such a manner that a constraint(s) on a bandwidth(s) of a link(s) through which a flow(s) passes is satisfied. For example, as illustrated in FIG. 2(b), the network management apparatus 2 determines a set of transmission rates used in an intermediate state by setting the transmission rate of the node 1/group 1 in the end state as the transmission rate of the node 1/group 1 in the intermediate state and setting the transmission rate of the node 2/group 1 in the start state as the transmission rate of the node 2/group 1 in the intermediate state. In this way, it is possible to gradually change the set of the transmission rates set for the plurality of groups from the start state to the end state without having the sum of transmission rates exceed the link capacity of the bottleneck link.

Exemplary Embodiment 1

Next, a network management system according to a first exemplary embodiment will be described with reference to drawings.
[Configuration]
FIG. 3 illustrates an example of a configuration of a network management system according to the present exemplary embodiment. As illustrated in FIG. 3, the network management system includes nodes N1 to Nm (m is a natural number of 2 or more) connected via a network 32 and a network management apparatus 10 controlling flows exchanged among the nodes N1 to Nm.

FIG. 4 is a block diagram illustrating a configuration example of the network management apparatus 10 illustrated in FIG. 3. As illustrated in FIG. 4, the network management apparatus 10 includes an information input I/F (interface) 12, an information storage part 14, a rate change procedure determination part 22, and a parameter setting part 26.

The information storage part 14 holds network topology information 16, start state parameters 18, and end state parameters 20. The right side in FIG. 6(a) illustrates a network topology among the nodes N1 to N4. On the right side in FIG. 6(a), the nodes N1 and N2 are connected to a switch S1 via links L1 and L2, respectively. The nodes N3 and N4 are connected to a switch S2 via links L3 and L4, respectively. The switches S1 and S2 are connected to each other via a link 5. The network topology information 16 includes information about this connection configuration of the network and information about link capacities of the links L1 to L5.

The left side in FIG. 6(a) illustrates a flow (Flow) included in an individual group in the start state and a minimum guaranteed bandwidth (MinRate) and a transmission rate (Rate) set for an individual group. In the example illustrated in FIG. 6(a), in the start state, the group 1 of the node N1 includes a flow directed to the node N3, and the corresponding minimum guaranteed bandwidth and transmission rate are "0" and "5", respectively. In addition, group 1 of the node N2 includes a flow directed to the node N4, and the corresponding minimum guaranteed bandwidth and transmission rate are "0" and "5", respectively. The start state parameters 18 include information illustrated in the table on the left side in FIG. 6(a) (namely, the flows that are included in the individual groups and the minimum guaranteed bandwidths, transmission rates, etc. that are set for the individual groups in the start state). Likewise, the end state parameters 20 include information illustrated in a table on the left side in FIG. 6(d) (namely, the flows that are included in the individual groups and the minimum guaranteed bandwidths, transmission rates, etc. that are set for the individual groups in the end state).

The information input I/F 12 receives the network topology information 16, the start state parameters 18, and the end state parameters 20 from, for example, a user and stores the received information and parameters in the information storage part 14. In addition, when the information input I/F 12 receives a state change instruction from a start state to an end state from the user, the information input I/F 12 instructs the rate change procedure determination part 22 and the parameter setting part 26 to determine a procedure to change the transmission rates set for the respective groups and execute the change from the start state to the end state in accordance with the determined procedure.

When a set of transmission rates set for a plurality of groups is gradually changed from a start state to an end state, the rate change procedure determination part 22 determines a set(s) of transmission rates used in the intermediate state(s) in such a manner that a constraint(s) on a bandwidth(s) of a link(s) through which a flow(s) passes is satisfied. In addition, when a constraint(s) is imposed on the minimum guaranteed bandwidth(s) set for a flow(s), the rate change procedure determination part 22 determines a set(s) of transmission rates used in the intermediate state(s) in such a manner that both the constraint(s) on the bandwidth(s) of the link(s) through which the flow(s) passes and the constraint(s) on the minimum guaranteed bandwidth(s) set for the flow(s) are satisfied.

The rate change procedure determination part 22 includes a parameter change part 24. The parameter change part 24 deletes and adds a transmission rate(s) set for a group(s) and a flow(s) included in a group(s) in accordance with the determined procedure. For example, in the example in FIGS. 6(a)-6(d), the parameter change part 24 sequentially changes the parameters as illustrated in the tables on the left sides in FIGS. 6(a) to 6(d).

The parameter setting part 26 includes a parameter transmission part 28 and a setting completion waiting part 30 and gradually changes a set of transmission rates set for a plurality of groups from the start state to the end state while using the set(s) of transmission rates determined by the rate change procedure determination part 22 in the intermediate state(s). Specifically, by using the parameter transmission part 28 and the setting completion waiting part 30, the parameter setting part 26 sets a calculated intermediate state in a relevant node(s). In addition, after synchronization is performed, the parameter setting part 26 shifts the current state to the next state. By repeating this operation, the parameter setting part 26 gradually changes the set of transmission rates from the start state to the end state.

The parameter transmission part 28 transmits a parameter(s) changed by the parameter change part 24 in accordance with the procedure determined by the rate change procedure determination part 22 to a relevant node(s) among the nodes N1 to Nm. For example, when the state in FIG. 6(a) is changed to the state in FIG. 6(b), the parameter transmission part 28 transmits an instruction for changing the transmission rate set for the group 1 and a new transmission rate "3" to the node N1.

The setting completion waiting part 30 awaits a notification(s) of completion of change of a parameter(s) from the node(s) which has been instructed to change the parameter(s). When receiving a notification(s) of the completion, the setting completion waiting part 30 notifies the parameter transmission part 28 of the reception of the notification(s). When notified of the reception, the parameter transmission part 28 transmits a next parameter(s) to a relevant node(s) among the nodes N1 to Nm in accordance with the procedure determined by the rate change procedure determination part 22. Subsequently, in accordance with the same procedure, the parameters are gradually changed from the start state to the end state.

[Operation]

Figure 5:
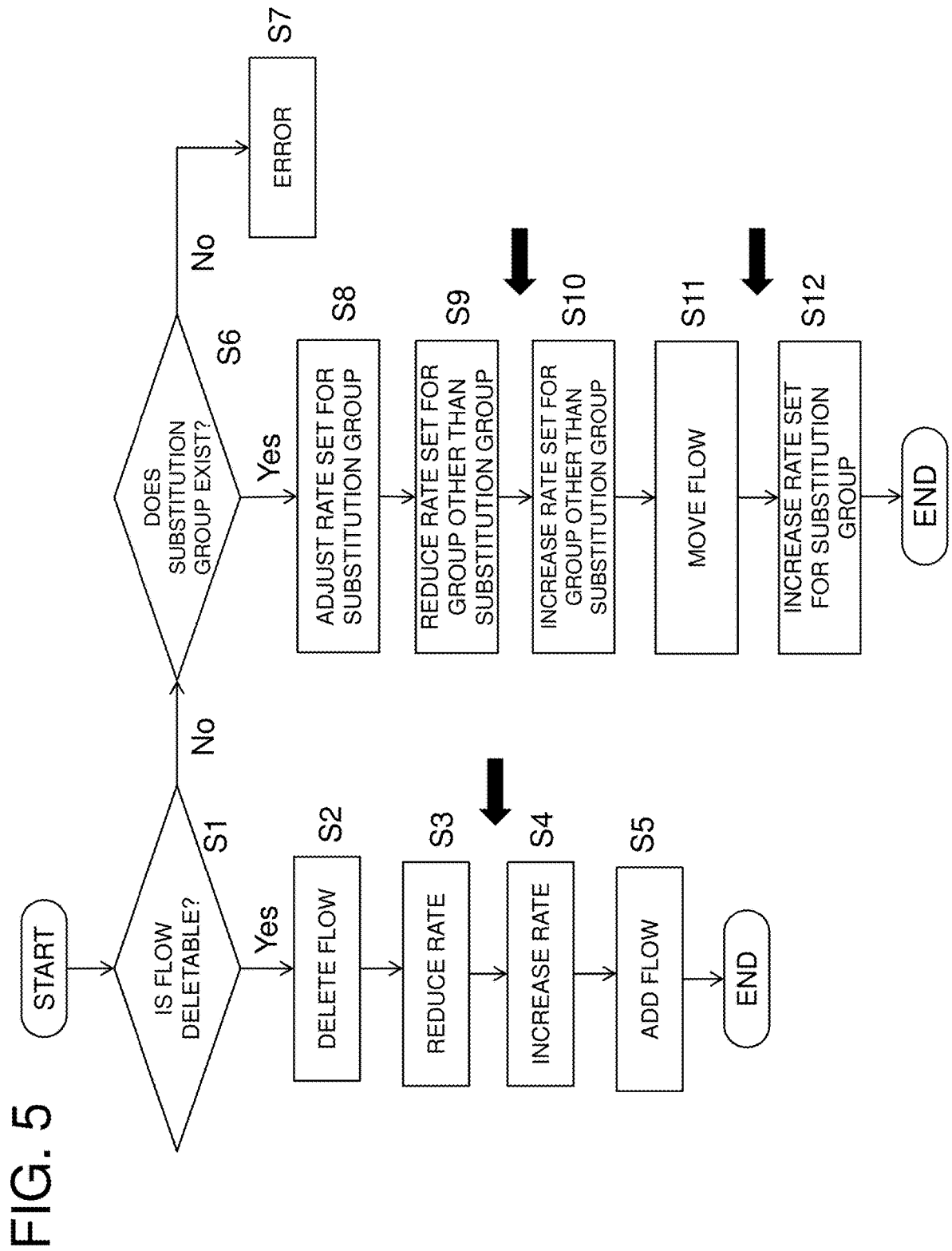
FIG. 5 is a flowchart illustrating an example of an operation of the network management apparatus according to the first exemplary embodiment.

Next, an operation of the network management apparatus 10 according to the present exemplary embodiment will be described with reference to a drawing. FIG. 5 is a flowchart illustrating an example of an operation of the rate change procedure determination part 22 in the network management apparatus 10 according to the present exemplary embodiment.

As illustrated in FIG. 5, when there is a group that includes a flow to be deleted in the end state, the rate change procedure determination part 22 determines whether the flow is deletable (step S1). For example, if a flow is only to be deleted or if a flow is to be moved to a different group in the end state and has no minimum guaranteed bandwidth, such a flow can be deleted. However, when a group includes a flow to be moved to a different group in the end state and has a transmission rate in the end state lower than that in the start state, if the transmission rate in the end state is used as a transmission rate in an intermediate state, a constraint on the minimum guaranteed bandwidth set for the flow could not be satisfied. In such a case, the flow is undeletable.

If a flow is deletable (Yes in step S1), the rate change procedure determination part 22 deletes the flow (step S2).

Next, if the transmission rate set for a group in the end state is lower than the transmission rate set for the group in the start state, the rate change procedure determination part 22 sets the transmission rate in the end state as the transmission rate set for the group in an intermediate state. In addition, if the transmission rate set for a group in the end state is higher than the transmission rate set for the group in the start state, the rate change procedure determination part 22 sets the transmission rate in the start state as the transmission rate set for the group in an intermediate state. In this way, the rate change procedure determination part 22 determines a set of transmission rates in an intermediate state. Namely, first, the rate change procedure determination part 22 reduces the transmission rate set for a group having a transmission rate reduced in the end state (step S3). Next, the rate change procedure determination part 22 increases the transmission rate for a group having a transmission rate increased in the end state (step S4). In addition, after the rate change procedure determination part 22 receives a notification of completion of the parameter setting in step S3 from the corresponding destination node by using the parameter setting part 26, the rate change procedure determination part 22 performs step S4. In FIG. 5, arrows indicate synchronization that the rate change procedure determination part 22 performs by using the parameter setting part 26.

Next, when there is a group to which a flow is added in the end state, the rate change procedure determination part 22 adds the flow to the group (step S5).

In contrast, if a flow cannot be deleted in step S1 (No in step S1), the rate change procedure determination part 22 determines whether a different group (referred to as a substitution group) other than the group including the undeletable flow can be used as a substitute (step S6). Using a different group as a substitute means adjusting the transmission rate set for a substitution group (for example, adjusting the transmission rate to a transmission rate lower than that in the end state). If there is no substitution group (No in step S6), the rate change procedure determination part 22 notifies the user of an error via the information input I/F 12 (step S7).

In contrast, if a substitution group exists (Yes in step S6), the rate change procedure determination part 22 adjusts the transmission rate set for the substitution group (step S8).

Next, the rate change procedure determination part 22 reduces the transmission rate for a group that is other than the substitution group and that has a transmission rate decreased in the end state (step S9).

After step S9, the rate change procedure determination part 22 performs synchronization by using the parameter setting part 26 and increases the transmission rate set for a group that is other than the substitution group and that has a transmission rate increased in the end state (step S10).

The rate change procedure determination part 22 moves the flow that could not be deleted in step S1 to the move destination group (step S11).

Next, after step S11, the rate change procedure determination part 22 performs synchronization by using the parameter setting part 26 and increases the transmission rate set for the substitution group up to the transmission rate in the end state (step S12).

The substitution group may be the move destination group of the flow that could not be deleted in step S1 or may be a different group.

Next, operations of the network management apparatus 10 will be described based on specific operation examples 1 to 3 illustrated in FIGS. 6 to 8. The following operation examples will be described with the network topology illustrated in the right sides in FIGS. 6(a) to 8(e). Namely, the nodes N1 and N2 are connected to the switch S1 via the links L1 and L2, respectively. The nodes N3 and N4 are connected to the switch S2 via the links L3 and L4, respectively. In addition, the switches S1 and S2 are connected to each other via the link 5. For simplicity, all the links L1 to L5 have a link capacity 10. In the operation examples 1 to 3, the number of nodes, the network topology, the link capacities, and the start and end states of the groups are only examples. Namely, the scope of the present disclosure is not limited to these specific examples.

Operation Example 1

FIGS. 6(a)-6(d) illustrate specific operation example 1 of the network management apparatus 10 according to the present exemplary embodiment. As illustrated on the left side in FIG. 6(a), in the start state, the group 1 of the node N1 includes a flow directed to the node N3, and the corresponding minimum guaranteed bandwidth and transmission rate are "0" and "5", respectively. In addition, the group 1 of the node N2 includes a flow directed to the node N4, and the corresponding minimum guaranteed bandwidth and transmission rate are "0" and "5", respectively. As illustrated on the left side in FIG. 6(d), in the end state, the group 1 of the node N1 includes a flow directed to the node N3, and the corresponding minimum guaranteed bandwidth and transmission rate are "0" and "3", respectively. In addition, the group 1 of the node N2 includes flows directed to the nodes N3 and N4, and the corresponding minimum guaranteed bandwidth and transmission rate are "0" and "7", respectively.

In operation example 1, there is no flow to be deleted. Thus, the rate change procedure determination part 22 skips Yes in step 1 and S2. Namely, first, as illustrated in FIG. 6(b), the rate change procedure determination part 22 reduces the transmission rate (Rate) set for the group 1 of the node N1, which has a transmission rate in the end state lower than that in the start state (step S3).

Next, as illustrated in FIG. 6(c), the rate change procedure determination part 22 increases the transmission rate (Rate) set for the group 1 of the node 2, which has a transmission rate in the end state higher than that in the start state (step S4).

Next, as illustrated in FIG. 6(d), the rate change procedure determination part 22 adds a flow directed to the node N3 to the group 1 of the node N2 (step S5).

Operation Example 2

FIGS. 7(a)-7(e) illustrate specific operation example 2 of the network management apparatus 10 according to the present exemplary embodiment. As illustrated on the left side in FIG. 7(a), in the start state, the group 1 of the node N1 includes a flow directed to the node N3, and the corresponding minimum guaranteed bandwidth and transmission rate are "1". In addition, the group 2 of the node N1 includes a flow directed to the node N4, and the corresponding minimum guaranteed bandwidth and transmission rate are "1". In addition, the group 1 of the node N2 includes a flow directed to the node N4, and the corresponding minimum guaranteed bandwidth and transmission rate are "0" and "8", respectively. In contrast, as illustrated on the left side in FIG. 7(e), in the end state, the group 1 of the node N1 includes flows directed to the nodes N3 and N4, and the corresponding minimum guaranteed bandwidth and transmission rate are "2" and "4", respectively. In addition, the group 2 of the node N1 does not include a flow. In addition, the group 1 of the node N2 includes a flow directed to the node N4, and the corresponding minimum guaranteed bandwidth and transmission rate are "0" and "6", respectively.

First, the rate change procedure determination part 22 determines whether the flow of the group 2 of the node N1 is deletable (step S1). If this flow is deleted, the minimum guaranteed bandwidth set for this flow cannot be satisfied (No in step S1).

Thus, as illustrates in FIG. 7(b), the rate change procedure determination part 22 selects the group 1 of the node N2 as a substitution group (Yes in step 6) and adjusts the transmission rate set for the substitution group to "5", which is smaller than the transmission rate "6" set for the group 1 of the node N2 in the end state (step S8).

In this example, since none of the groups, other than the substitution group, have the transmission rate to be reduced in the end state, the rate change procedure determination part 22 skips step S9.

Next, the rate change procedure determination part 22 increases the transmission rate set for a group other than the substitution group to the transmission rate set for this group in the end state (step S10). In this example, as illustrated in FIG. 7(c), the rate change procedure determination part 22 increases the transmission rate set for the group 1 of the node N1 to "4", which is the transmission rate set for the group 1 of the node N1 in the end state.

Next, as illustrated in FIG. 7(d), the rate change procedure determination part 22 moves the flow that could not be deleted in step S1 (namely, the flow of the group 2 of the node N1 directed to the node N4) to the corresponding move destination group (namely, to the group 1 of the node N1) (step S11).

In addition, as illustrated in FIG. 7(e), the rate change procedure determination part 22 increases the transmission rate set for the substitution group to "6", which is the actual transmission rate of the substitution group in the end state (step S12).

Operation Example 3

FIGS. 8(a)-8(e) illustrate specific operation example 3 of the network management apparatus 10 according to the present exemplary embodiment. In above operation example 2, the rate change procedure determination part 22 has selected a group other than the move destination group, to which the flow determined to be undeletable in step S1 is moved, as the substitution group. Alternatively, the rate change procedure determination part 22 may select this move destination group, to which the flow determined to be undeletable in step S1 is moved, as the substitution group. In the present operation example, this alternative case will be described.

First, the rate change procedure determination part 22 determines whether a flow of the group 2 of the node N1 is deletable (step S1). If this flow is deleted, the minimum guaranteed bandwidth set for this flow cannot be satisfied (No in step S1).

Figure 8A:
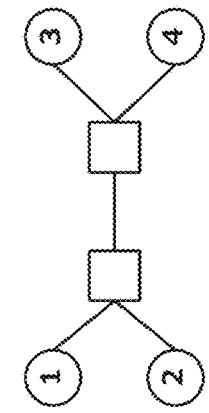
FIGS. 8(a)-(e) illustrate specific operation example 3 of the network management apparatus according to the first exemplary embodiment.
Figure 8B:
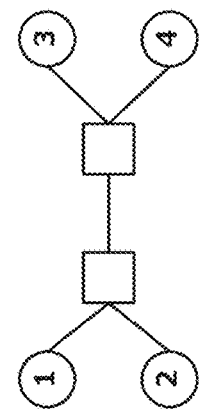
Figure 8C:
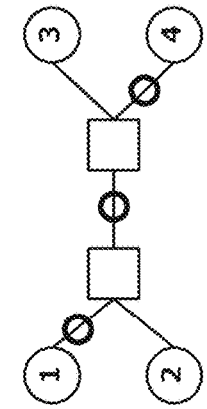

Thus, as illustrated in FIG. 8(b), the rate change procedure determination part 22 selects the group 1 of the node N1 as a substitution group (Yes in step S6) and adjusts the transmission rate set for this substitution group to "3", which is smaller than the transmission rate "4" set for this substitution group in the end state (step S8).

Next, the rate change procedure determination part 22 reduces the transmission rate set for a group that is other than the substitution group and that has a transmission rate to be reduced in the end state (namely, the group 1 of the node N2) (step S9).

In this example, since none of the groups, other than the substitution group, have a transmission rate in the end state higher than that in the start state, the rate change procedure determination part 22 skips step S10.

Figure 8D:
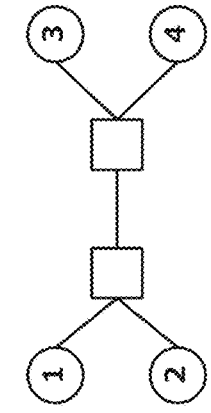

Next, as illustrated in FIG. 8(d), the rate change procedure determination part 22 moves the flow that could not be deleted in step S1 (namely, the flow of the group 2 of the node N1 directed to the node N4) to the move destination group (namely, to the group 1 of the node N1) (step S11).

Figure 8E:
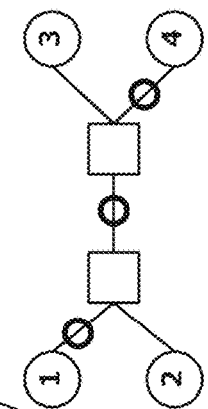

In addition, as illustrated in FIG. 8(e), the rate change procedure determination part 22 increases the transmission rate set for the substitution group (namely, the group 1 of the node N1) to "4", which is the actual transmission rate of the substitution group in the end state (step S12).

Other Operation Examples

In above operation examples 1 to 3, a case in which a flow is added (operation example 1), a case in which a group to which a flow belongs is changed (operation examples 2 and 3), a case in which a group is deleted (operation examples 2 and 3), and a case in which the transmission rate set for a group is increased or reduced (operation examples 1 to 3) have been described. As another operation example in which a flow is deleted, the flow may be deleted in step S2 in FIG. 5. As yet another operation example in which a group is added, the group may be added at timing in step S4 or step S10 in FIG. 5.

Advantageous Effects

With the network management system according to the present exemplary embodiment, since a set of transmission rates set for a plurality of groups is gradually changed, synchronization does not need to be performed among the plurality of nodes N1 to Nm which are the transmission sources of the flows included in the plurality of groups. In addition, unlike the technique disclosed in PTL 2, since no specific constraints are imposed on the transmission rates in the start and end states, it is possible to flexibly change the transmission rates. Furthermore, by selecting an intermediate state(s) in such a manner that a constraint(s) on a bandwidth(s) of a link(s) through which a flow(s) passes is satisfied, the constraint(s) on the link bandwidth(s) can be satisfied throughout the period from the start state to the end state.

In particular, if a transmission rate set for a group in the end state is lower than the transmission rate set for the group in the start state, the transmission rate is decreased first. In addition, if the transmission rate set for a group in the end state is higher than the transmission rate set for the group in the start state, the transmission rate is increased later. In this way, the constraint(s) on the link bandwidth(s) can be satisfied. In addition, if the transmission rate set for a group including a flow which is to be moved to a different group in the end state and on which a constraint on the minimum guaranteed bandwidth is imposed is set to the transmission rate set for the different group in the end state, there are cases in which the constraint on the minimum guaranteed bandwidth cannot be satisfied. In such cases, the transmission rate for the different group (namely, a substitution group or the move destination group) is temporarily set to a value lower than the corresponding transmission rate in the end state. After the flow is moved to the move destination group, the transmission rate set for the substitution group is changed to the actual transmission rate in the end state.

By adopting the above configurations and operations, the network management apparatus according to the present exemplary embodiment can flexibly change a set of transmission rates set for a plurality of groups including flows while constraints on link bandwidths are satisfied without needing to perform time synchronization among nodes.

Exemplary Embodiment 2

Figure 9:
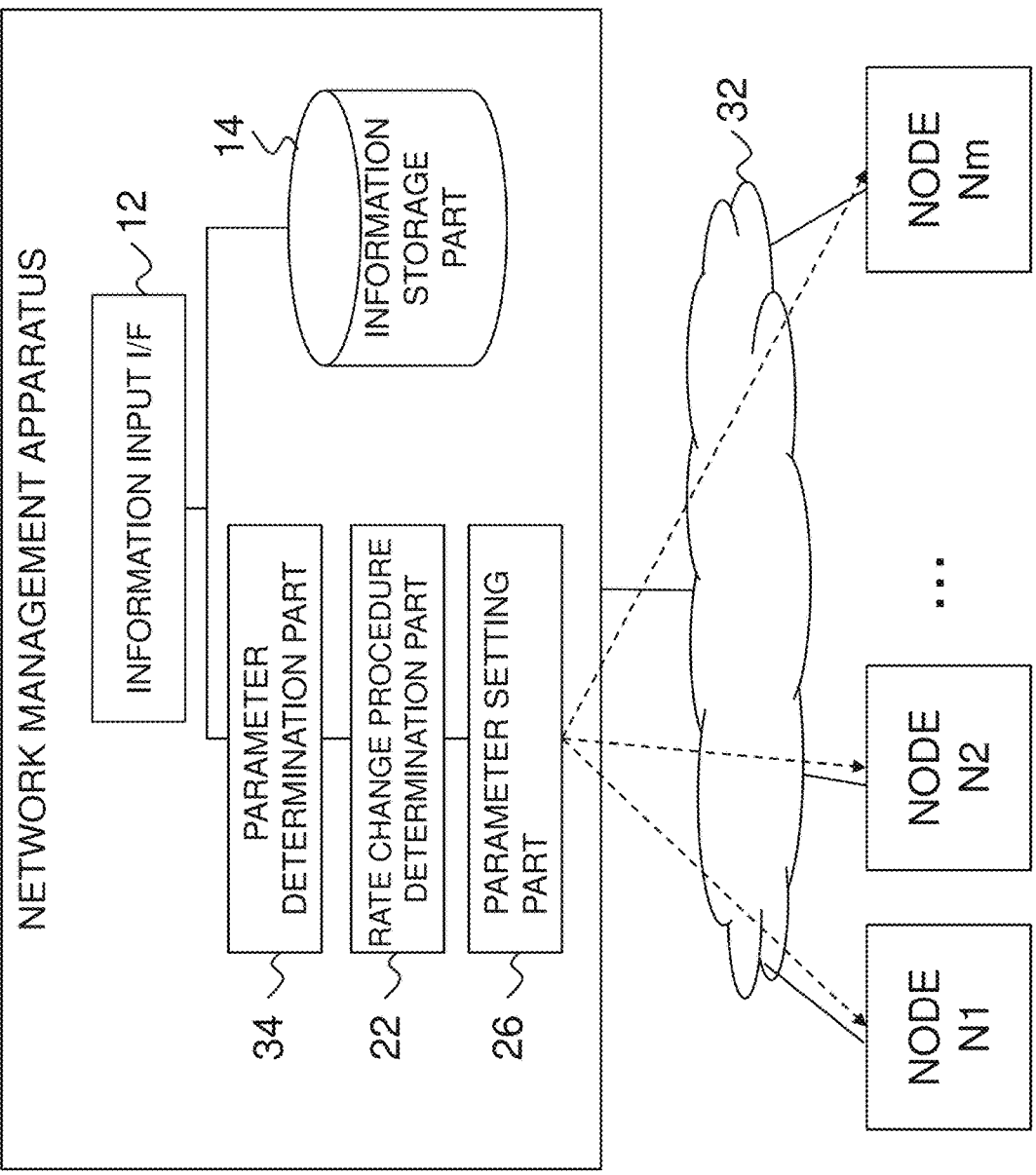
FIG. 9 illustrates an example of a configuration of a network management system according to a second exemplary embodiment.
Figure 10:
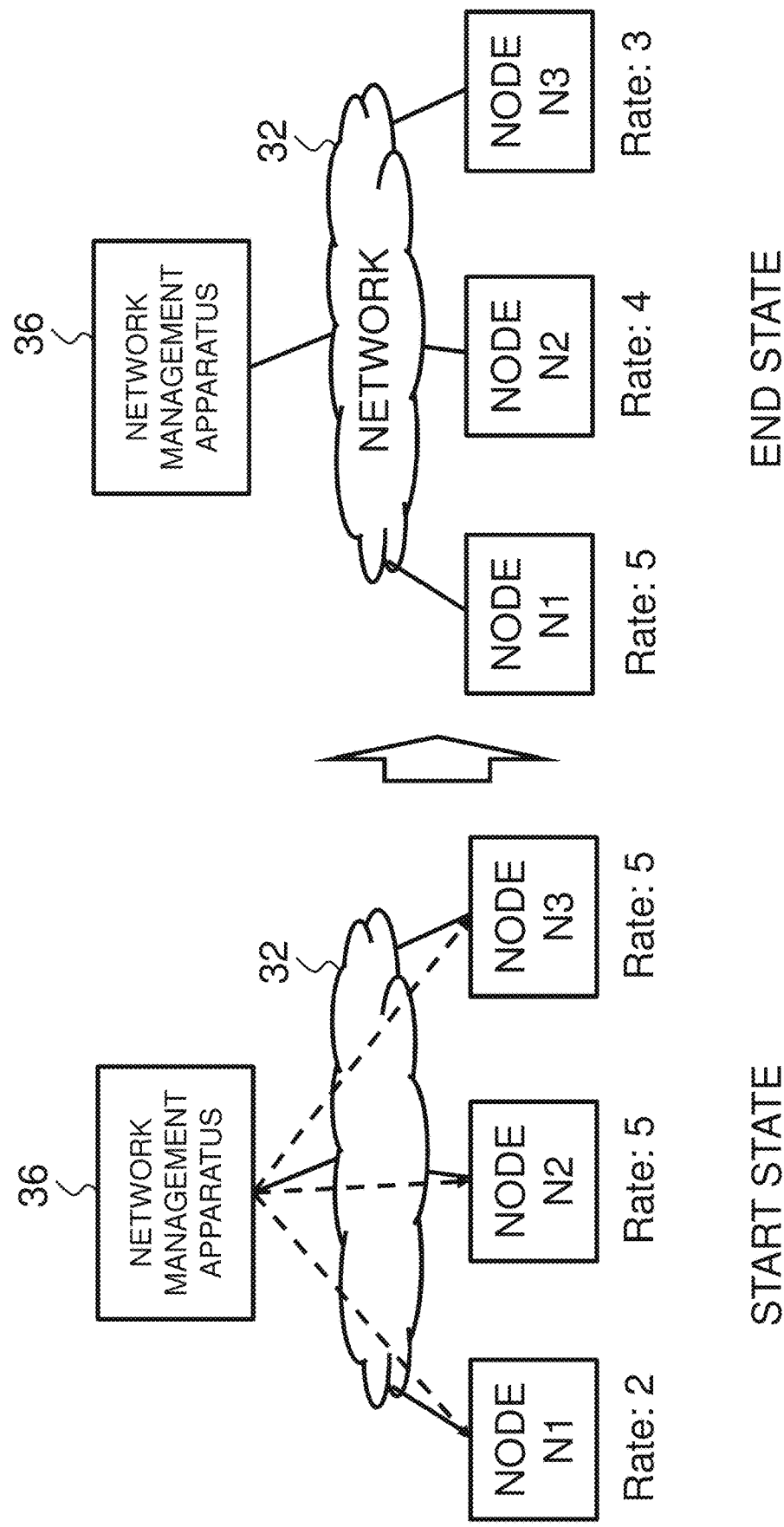
FIG. 10 illustrates a problem with a related technique.

Next, a network according to a second exemplary embodiment will be described with reference to a drawing.
[Configuration]
FIG. 9 illustrates an example of a configuration of a network management system according to the present exemplary embodiment. As illustrated in FIG. 9, in addition to the configuration of the network management apparatus 10 (FIG. 3) according to the first exemplary embodiment, a network management apparatus 10 in the network management system according to the present exemplary embodiment further includes a parameter determination part 34.

The information input I/F 12 receives topology information about the connections among the nodes included in the communication system and node-pair information about a pair(s) of nodes (specifically, a pair(s) of a transmission node and a reception node, namely, a flow(s)) that communicates with each other in the start state and the end state. Based on the topology information and the node-pair information, the parameter determination part 34 simultaneously determines groups, each of which includes one or more node-pairs (flows), and transmission rates allocated to these groups in each of the start and end states. Namely, for example, as illustrated in FIGS. 6(a), 6(d), 7(a), and 7(e), the network management apparatus 10 according to the present exemplary embodiment determines a combination of flows included in the groups and transmission rates set for these groups in the start state as well as a combination of flows included in the groups and transmission rates set for these groups in the end state.

The parameter determination part 34 may determine flows included in the groups and transmission rates set for these groups, based on a predetermined objective function(s) and constraint condition(s) disclosed in exemplary embodiments 1 to 3 in Japanese patent application No. 2015-057989.
[Operation]
The network management apparatus 10 in the network management system in the present exemplary embodiment calculates groups and transmission rates set for these groups in the start and end states. This operation differs from that according to the first exemplary embodiment in which the network management apparatus 10 receives such information as input information. Since other operations of the network management apparatus according to the present exemplary embodiment are the same as those according to the first exemplary embodiment, description thereof will be omitted.

Advantageous Effects

In the network management system in the present exemplary embodiment, time when nodes do not communicate with each other is taken into consideration, and the network management apparatus determines transmission rates while grouping as many node-pairs (flows) as possible both in the start and end states. Thus, in addition to the advantageous effects provided by the network management system according to the first exemplary embodiment, the present exemplary embodiment provides an additional advantageous effect of improving the utilization efficiency of the network.

The disclosure of the above PTLs is incorporated herein by reference thereto. Variations and adjustments of the exemplary embodiments are possible within the scope of the overall disclosure (including the claims) of the present invention and based on the basic technical concept of the present invention. Various combinations and selections of various disclosed elements (including the elements in the claims, exemplary embodiments, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

The above exemplary embodiments can partly or entirely be described as, but not limited to, the following notes.

[Mode 1]
See the network management apparatus according to the above first aspect.

[Mode 2]
The network management apparatus according to mode 1, wherein the determination part determines a set(s) of transmission rates used in an intermediate state(s) in such a manner that a constraint(s) on a bandwidth(s) of a link(s) through which a flow(s) passes and a constraint(s) on a minimum guaranteed bandwidth(s) set for the flow(s) are satisfied.

[Mode 3]
The network management apparatus according to mode 1 or 2, wherein the determination part determines, as the transmission rates used in the intermediate state(s), a set(s) of transmission rates by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

[Mode 4]
The network management apparatus according to any one of modes 1 to 3, wherein, when there is a group(s) including a flow(s) which is to be deleted after the change and on which a minimum guaranteed bandwidth(s) is not imposed, after the flow(s) is deleted from the group(s), the setting part gradually changes the set of transmission rates set for the plurality of groups from the start state to the end state.

[Mode 5]
The network management apparatus according to any one of modes 1 to 4, wherein, when there is a group(s) to which a flow(s) is added in the end state, after the setting part gradually changes the set of transmission rates set for the plurality of groups from the start state to the end state, the setting part adds the flow(s) to the group(s).

[Mode 6]
The network management apparatus according to any one of modes 1 to 5,
  wherein, when the determination part determines a set(s) of transmission rates by allowing a first group(s) that includes a flow(s) to be moved to a different group(s) in the end state and that has a transmission rate(s) in the end state lower than a transmission rate(s) in the start state to have the transmission rate(s) in the end state, if a constraint(s) on a minimum guaranteed bandwidth(s) set for the flow(s) cannot be satisfied, the determination part determines a set(s) of transmission rates by allowing the first group(s) to have the transmission rate(s) in the start state and allowing a second group(s) other than the first group(s) to have a transmission rate(s) lower than a corresponding transmission rate(s) in the end state as the set(s) of transmission rate(s) used in the intermediate state(s), and
  wherein, after the intermediate state(s), the setting part first moves the flow(s) to the different group(s) and next changes the transmission rate(s) set for the second group(s) to the corresponding transmission rate(s) in the end state.

[Mode 7]
The network management apparatus according to mode 6, wherein the second group(s) is a group(s) other than the different group(s).

[Mode 8]
The network management apparatus according to mode 6, wherein the second group(s) is the different group(s).

[Mode 9]
See the network management method according to the above second aspect.

[Mode 10]
The network management method according to mode 9, wherein a set(s) of transmission rates used in an intermediate state(s) is determined in such a manner that a constraint(s) on a bandwidth(s) of a link(s) through which a flow(s) passes and a constraint(s) on a minimum guaranteed bandwidth(s) set for the flow(s) are satisfied.

[Mode 11]
The network management method according to mode 9 or 10, wherein a set(s) of transmission rates is determined as the transmission rates used in the intermediate state(s) by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

[Mode 12]
The network management method according to any one of modes 9 to 11, wherein, when there is a group(s) including a flow(s) which is to be deleted after the change and on which a minimum guaranteed bandwidth(s) is not imposed, after the flow(s) is deleted from the group(s), the set of transmission rates set for the plurality of groups is gradually changed from the start state to the end state.

[Mode 13]
The network management method according to any one of modes 9 to 12, wherein, when there is a group(s) to which a flow(s) is added in the end state, after the set of transmission rates set for the plurality of groups is gradually changed from the start state to the end state, the flow(s) is added to the group(s).

[Mode 14]
The network management method according to any one of modes 9 to 13, wherein, wherein, when it is determined that a first group(s) that includes a flow(s) to be moved to a different group(s) in the end state and that has a transmission rate(s) in the end state lower than a transmission rate(s) in the start state is set to have the transmission rate(s) in the end state, if a constraint(s) on a minimum guaranteed bandwidth(s) set for the flow(s) cannot be satisfied, a set(s) of transmission rates is determined, as the set(s) of transmission rate(s) used in the intermediate state(s), by allowing the first group(s) to have the transmission rate(s) in the start state and allowing a second group(s) other than the first group(s) to have a transmission rate(s) lower than a corresponding transmission rate(s) in the end state, and wherein, after the intermediate state(s), first, the flow(s) is moved to the different group(s), and next, the transmission rate(s) set for the second group(s) is changed to the corresponding transmission rate(s) in the end state.

[Mode 15]
The network management method according to mode 14, wherein the second group(s) is a group(s) other than the different group(s).

[Mode 16]
The network management method according to mode 14, wherein the second group(s) is the different group(s).
[Mode 17]
See the network management system according to the above third aspect.
[Mode 18]
See the program according to the above fourth aspect.

REFERENCE SIGNS LIST 2 network management apparatus
4 determination part
6 setting part
10 network management apparatus
12 information input I/F
14 information storage part
16 network topology information
18 start state parameters
20 end state parameters
22 rate change procedure determination part
24 parameter change part
26 parameter setting part
28 parameter transmission part
30 setting completion waiting part
32 network
34 parameter determination part
36 network management apparatus
N1-Nm node
L1-L5 link
S1, S2 switch

What is claimed is:

1. A network management apparatus, comprising:
a determination part that determines, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied; and
a setting part that gradually changes the set of transmission rates set for the plurality of groups from the start state to the end state while using the determined set(s) of transmission rates in the intermediate state(s),
wherein the determination part determines, as the transmission rates used in the intermediate state(s), the set(s) of transmission rates by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

2. The network management apparatus according to claim 1, wherein the determination part determines a set(s) of transmission rates used in an intermediate state(s) in such a manner that a constraint(s) on a bandwidth(s) of a link(s) through which a flow(s) passes and a constraint(s) on a minimum guaranteed bandwidth(s) set for the flow(s) are satisfied.

3. The network management apparatus according to claim 2, wherein, when there is a group(s) including a flow(s) which is to be deleted after the change and on which a minimum guaranteed bandwidth(s) is not imposed, after the flow(s) is deleted from the group(s), the setting part gradually changes the set of transmission rates set for the plurality of groups from the start state to the end state.

4. The network management apparatus according to claim 2, wherein, when there is a group(s) to which a flow(s) is added in the end state, after the setting part gradually changes the set of transmission rates set for the plurality of groups from the start state to the end state, the setting part adds the flow(s) to the group(s).

5. The network management apparatus according to claim 1, wherein, when there is a group(s) including a flow(s) which is to be deleted after the change and on which a minimum guaranteed bandwidth(s) is not imposed, after the flow(s) is deleted from the group(s), the setting part gradually changes the set of transmission rates set for the plurality of groups from the start state to the end state.

6. The network management apparatus according to claim 1, wherein, when there is a group(s) to which a flow(s) is added in the end state, after the setting part gradually changes the set of transmission rates set for the plurality of groups from the start state to the end state, the setting part adds the flow(s) to the group(s).

7. The network management apparatus according to claim 1,
wherein, when the determination part determines that a first group(s) that includes a flow(s) to be moved to a different group(s) in the end state and that has a transmission rate(s) in the end state lower than a transmission rate(s) in the start state is set to have the transmission rate(s) in the end state, if a constraint(s) on a minimum guaranteed bandwidth(s) set for the flow(s) cannot be satisfied, the determination part determines a set(s) of transmission rates, as the set(s) of transmission rate(s) used in the intermediate state(s), by allowing the first group(s) to have the transmission rate(s) in the start state and allowing a second group(s) other than the first group(s) to have a transmission rate(s) lower than a corresponding transmission rate(s) in the end state, and
wherein, after the intermediate state(s), the setting part first moves the flow(s) to the different group(s) and next changes the transmission rate(s) set for the second group(s) to the corresponding transmission rate(s) in the end state.

8. The network management apparatus according to claim 7, wherein the second group(s) is a group(s) other than the different group(s).

9. The network management apparatus according to claim 7, wherein the second group(s) is the different group(s).

10. A network management method, comprising:
determining, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied; and
gradually changing the set of transmission rates set for the plurality of groups from the start state to the end state while using the determined set(s) of transmission rates in the intermediate state(s),
wherein the set(s) of transmission rates is determined as the transmission rates used in the intermediate state(s) by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

11. The network management method according to claim 10, wherein a set(s) of transmission rates used in an intermediate state(s) is determined in such a manner that a constraint(s) on a bandwidth(s) of a link(s) through which a flow(s) passes and a constraint(s) on a minimum guaranteed bandwidth(s) set for the flow(s) are satisfied.

12. The network management method according to claim 10, wherein, when there is a group(s) including a flow(s) which is to be deleted after the change and on which a minimum guaranteed bandwidth(s) is not imposed, after the flow(s) is deleted from the group(s), the set of transmission rates set for the plurality of groups is gradually changed from the start state to the end state.

13. The network management method according to claim 10, wherein, when there is a group(s) to which a flow(s) is added in the end state, after the set of transmission rates set for the plurality of groups is gradually changed from the start state to the end state, the flow(s) is added to the group(s).

14. The network management method according to claim 10, wherein, wherein, when it is determined that a first group(s) that includes a flow(s) to be moved to a different group(s) in the end state and that has a transmission rate(s) in the end state lower than a transmission rate(s) in the start state is set to have the transmission rate(s) in the end state, if a constraint(s) on a minimum guaranteed bandwidth(s) set for the flow(s) cannot be satisfied, a set(s) of transmission rates is determined, as the set(s) of transmission rate(s) used in the intermediate state(s), by allowing the first group(s) to have the transmission rate(s) in the start state and allowing a second group(s) other than the first group(s) to have a transmission rate(s) lower than a corresponding transmission rate(s) in the end state, and wherein, after the intermediate state(s), first, the flow(s) is moved to the different group(s), and next, the transmission rate(s) set for the second group(s) is changed to the corresponding transmission rate(s) in the end state.

15. The network management method according to claim 14, wherein the second group(s) is a group(s) other than the different group(s).

16. The network management method according to claim 14, wherein the second group(s) is the different group(s).

17. A network management system, comprising:
a plurality of nodes: and
a network management apparatus that manages the plurality of nodes;

wherein the network management apparatus includes: a determination part that determines, when a set of transmission rates set for a plurality of groups including one or more flows exchanged among the plurality of nodes is gradually changed from a start state to an end state, a set(s) of transmission rates used in an intermediate state(s) in such a manner that a constraint(s) on a bandwidth(s) of a link(s) through which a flow(s) passes is satisfied; and a setting part that gradually changes the set of transmission rates set for the plurality of groups from the start state to the end state while using the determined set(s) of transmission rates in the intermediate state(s), wherein the determination part determines, as the transmission rates used in the intermediate state(s), the set(s) of transmission rates by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

18. A non-transitory computer-readable recording medium storing thereon a program, causing a computer to execute processing for:

determining, when a set of transmission rates set for a plurality of groups including one or more flows is gradually changed from a start state to an end state, a set(s) of transmission rates used in an intermediate state(s) in such a manner that a constraint(s) on a bandwidth(s) of a link(s) through which a flow(s) passes is satisfied; and gradually changing the set of transmission rates set for the plurality of groups from the start state to the end state while using the determined set(s) of transmission rates in the intermediate state(s), wherein the set(s) of transmission rates is determined as the transmission rates used in the intermediate state(s) by allowing a group(s) having a transmission rate(s) in the end state lower than a transmission rate(s) in the start state to have the transmission rate(s) in the end state and allowing a group(s) having a transmission rate(s) in the end state higher than a transmission rate(s) in the start state to have the transmission rate(s) in the start state.

* * * * *

UNITED STATES PATENT AND TRADEMARK OFFICE
CERTIFICATE OF CORRECTION

| | |
|---|---|
| PATENT NO. | : 10,797,957 B2 |
| APPLICATION NO. | : 15/771800 |
| DATED | : October 6, 2020 |
| INVENTOR(S) | : Yuki Hayashi, Jun Suzuki and Masaki Kan |

It is certified that error appears in the above-identified patent and that said Letters Patent is hereby corrected as shown below:

In the Specification

Column 4, Preferred Modes, Line 64; After "rates", delete "240"

Signed and Sealed this
Fifteenth Day of December, 2020

Andrei Iancu
*Director of the United States Patent and Trademark Office*